US012790213B2

(12) United States Patent
Forbes et al.

(10) Patent No.: US 12,790,213 B2
(45) Date of Patent: Nov. 10, 2026

(54) MECHANOCHEMICAL OXIDATION METHOD

(71) Applicant: UNIVERSITY OF IOWA RESEARCH FOUNDATION, Iowa City, IA (US)

(72) Inventors: Tori M. Forbes, Iowa City, IA (US); Dmytro V. Kravchuk, Iowa City, IA (US)

(73) Assignee: UNIVERSITY OF IOWA RESEARCH FOUNDATION, lowa City, IA (US)

( * ) Notice: Subject to any disclaimer, the term of this patent is extended or adjusted under 35 U.S.C. 154(b) by 763 days.

(21) Appl. No.: 18/085,880

(22) Filed: Dec. 21, 2022

(65) Prior Publication Data

US 2023/0202843 A1 Jun. 29, 2023

Related U.S. Application Data

(60) Provisional application No. 63/292,248, filed on Dec. 21, 2021.

(51) Int. Cl.
*C01B 15/047* (2006.01)

(52) U.S. Cl.
CPC ...... *C01B 15/0475* (2013.01); *C01P 2002/74* (2013.01)

(58) Field of Classification Search
CPC .................................................. C01B 15/0475
See application file for complete search history.

(56) References Cited

U.S. PATENT DOCUMENTS

| | | |
|---|---|---|
| 4,024,215 A | 5/1977 | Caropreso et al. |
| 4,247,495 A | 1/1981 | Ennerst et al. |

FOREIGN PATENT DOCUMENTS

| | | |
|---|---|---|
| CA | 1076365 A | 4/1980 |
| CN | 107837896 A | 3/2018 |
| RU | 2598943 C1 | 10/2016 |

OTHER PUBLICATIONS

Abdel-Rahman, M. , et al., "Ore Leashing Processing for Yellow Cake Production and Assay of their Uranium Content by Radiometric Analysis", Journal of Inorganic and General Chemistry 644 (1), 29-32 (2018).
Alanko, G. A. , et al., "Mechanochemical synthesis of uranium sesquisilicide", Journal of Nuclear Materials 451, 243-248 (2014).
Alexander, P. , et al., "Formation of Activated Hydrogen Peroxide by Irradiation of Water with α-Rays", Nature 188, 574-575 (1960).
Arteaga, A. , et al., "Uranyl-Peroxide Capsule Self-Assembly in Slow Motion", Chem Eur J 25, 6087-6091 (2019).
Burns, P. C. , et al., "Captivation with Encapsulation: A dozen years of exploring uranyl peroxide capsules", Dalton Transactions 47, 5916-5927 (2018).
Burns, P. C. , "Nanoscale uranium-based cage clusters inspired by uranium mineralogy", Mineralogical Magazine 75. 1-25 (2011).
Burns, P. C. , et al., "Nuclear Fuel in a Reactor Accident", Science 335, 1184-1188 (2012).
Canizares, A. , et al., "In situ Raman monitoring of materials under irradiation: study of uranium dioxide alteration by water radiolysis", Journal of Raman Spectroscopy 43, 1492-1497 (2012).
Diaz, A. , et al., "Photoinduced Transformation of Uranyl Nitrate Crown Ether Compounds", European Journal of Inorganic Chemistry 2021(2), 166-176 (2021).
Do, J. , et al., "Mechanochemistry: A Force of Synthesis", ASC Centrral Science 3, 13-19 (2017).
Duke, F. R. , et al., "The Homogeneous Base-Catalyzed Decomposition of Hydrogen Peroxide1", The Journal of Physical Chemistry 65, 304-306 (1961).
Edwards, C. R. , et al., "Uranium processing: A review of current methods and technology", JOM 52, 12-20 (2000).
Ewing, R. C. , et al., "Corrosion of Spent Nuclear Fuel: The Long-Term Assessment", University of Michigan Annual Report, 1-7 (2002).
Ewing, R. C. , "Long-term storage of spent nuclear fuel", Nature Materials 14, 252-257 (2015).
Fetrow, T. V. , et al., "Chelating Borohydrides for Lanthanides and Actinides: Structures, Mechanochemistry, and Case Studies with Phosphinodiboranates", Inorganic Chemistry 59, 48-61 (2020).
Fetrow, T. V. , et al., "Mechanochemical synthesis and structural analysis of trivalent lanthanide and uranium diphenylphosphinodiboranates", Dalton Transactions 50, 11472-11484 (2021).
Friscic, T. , et al., "Mechanochemistry for Synthesis", Angewandte Chemie International Edition 59, 1018-1029 (2020).
Gray, W. J. , et al., "Scientific basis for nuclear waste management XX", Materials Research Society, Abstract, 1 page (1997).
Guo, X. , et al., "Energetics of metastudtite and implications for nuclear waste alteration", PNAS 111, 17737-17742 (2014).
Hanson, B. , et al., "Corrosion of commercial spent nuclear fuel", Radiochimica Acta 93, 159-168 (2005).
Hayyan, M. , et al., "Superoxide Ion: Generation and Chemical Implications", Chemical Reviews 116, 3029-3085 (2016).
Hickam, S. , et al., "Effects of H2O2 Concentration on Formation of Uranyl Peroxide Species Probed by Dissolution of Uranium Nitride and Uranium Dioxide", Inorganic Chemistry 58, 5858-5864 (2019).
Jayasinghe, A. S. , et al., "Utilizing Autoxidation of Solvents to Promote the Formation of Uranyl Peroxide Materials", Crystal Growth & Design 19, 1756-1766 (2019).
Jegou, C. , et al., "Effect of external gamma irradiation on dissolution of the spent UO2 fuel matrix", Journal of Nuclear Materials 341, 62-82 (2005).
Kitawaki, S. , et al., "Chlorination of uranium oxides with CCl4 using a mechanochemical method", Journal of Nuclear Materials 439, 212-216 (2013).

(Continued)

*Primary Examiner* — James A Fiorito
(74) *Attorney, Agent, or Firm* — Viksnins Harris Padys Malen LLP

(57) ABSTRACT

The invention provides a method for preparing an actinide metal peroxide from a corresponding actinide metal oxide under solid reaction conditions.

4 Claims, No Drawings

(56) References Cited

OTHER PUBLICATIONS

Kovacheva, P. , et al., "Mechanochemistry of the 5f-element compounds Part 3. Mechanochemically stimulated formation of nitrosyl uranyl nitrate", Journal of Radioanalytical and Nuclear Chemistry 274, 473-479 (2007).
Kovacheva, P , et al., "Mechanochemistry of the 5f-element compounds Part 4. Mechanochemistry of uranium (IV and VI) oxides", Journal of Radioanalytical and Nuclear Chemistry 274, 481-490 (2007).
Kovacheva, P. , et al., "Mechanochemistry of the 5f-elements compounds. 5. Influence of the reaction medium on the mechanochemically induced reduction of U3O8", Journal of Radioanalytical and Nuclear Chemistry 287, 193-197 (2011).
Kravchuk, D. V. , et al., "In Situ Generation of Organic Peroxide to Create a Nanotubular Uranyl Peroxide Phosphate", Angewandte Chemie International Edition 58, 18429-18433 (2019).
Kravchuk, D. V. , et al., "Isolation and Reactivity of Uranyl Superoxide", Angewandte Chemie International Edition 60, 15041-15048 (2021).
Kubatko, K. , et al., "Stability of Peroxide-Containing Uranyl Minerals", Science 302, 1191-1193 (2003).
Popel, A. , et al., "The effect of ion irradiation on the dissolution of UO2 and UO2-based simulant fuel", Journal of Alloys and Compounds 735, 1350-1356 (2018).
Radi, R. , "Oxygen radicals, nitric oxide, and peroxynitrite: Redoxpathways in molecular medicine", Proceedings of the National Academy of Sciences 115, 5839-5848 (2018).
Ridenour, J. A. , et al., "Synthesis, structural analysis, and supramolecular assembly of a series of in situ generated uranyl-peroxide complexes with functionalized 2,2'-bipyridine and varied carboxylic acid ligands", New Journal of Chemistry 42, 1816-1831 (2018).
Sarrasin, L. , et al., "Studtite formation assessed by Raman spectroscopy and 18O isotopic labeling during the oxidative dissolution of a MOX fuel", The Journal of Physical Chemistry C 125, 19209-19218 (2021).
Sato, T. , "Preparation of uranium peroxide hydrates", Journal of Applied Chemistry 13, 361-365 (1963).
Silverman, L. , et al., "Catalytic Decomposition of Hydrogen Peroxide and Uranyl Peroxide", Industrial and Engineering Chemistry 50 (12), 1785-1786 (1958).
Thangavelu, S. G. , et al., "Uranyl-Promoted Peroxide Generation: Synthesis and Characterization of Three Uranyl Peroxo [(UO2)2(O2)] Complexes", Inorganic Chemistry 54, 4208-4221 (2015).
Waltz, W. L. , et al., "Photooxidation of water and isobutane in aqueous uranyl solutions", Inorganica Chimica Acta 285, 322-325 (1999).
Yakabuskie, P. A. , et al., "Long-Term γ-Radiolysis Kinetics of NO3- and NO2-Solutions", The Journal of Physical Chemistry 115, 4270-4278 (2011).
Zubekhina, B. , et al., "Long-Term Aging of Chernobyl Fuel Debris: Corium and "Lava"", Sustainability 13, 1073, 9 pages (2021).

MECHANOCHEMICAL OXIDATION METHOD

CROSS-REFERENCE TO RELATED APPLICATION

This application claims priority to U.S. Provisional Application Number 63/292,248 that was filed on Dec. 21, 2021. The entire content of the application referenced above is hereby incorporated by reference herein.

BACKGROUND

Formation of hexavalent uranium U(VI) peroxide complexes and solids has been demonstrated in chemically diverse environments and is particularly important to the fuel cycle for light-water nuclear reactors. U(VI) peroxides have been identified in natural geologic systems as mineral phases (studtite and metastudtite) within ore deposites (K.-A. H. Kubatko, et al., *Science,* 2003, 302, 1191-1193). Studtite and metastudtite are the only known peroxide bearing minerals and their presence as naturally occurring phases demonstrates the stability of the peroxide within U(VI) solids (K.-A. H. Kubatko, et al., *Science,* 2003, 302, 1191-1193). These U(VI) peroxide phases are also industrially relevant materials for the front-end of the nuclear fuel cycle (South Africa Pat., ZA patent document 76/2451/A/, 1976; and R. C. Ewing, *Corrosion of spent nuclear fuel: the long-term assessment*, University of Michigan, Ann Arbor, Michigan (US), 2003). In the mining process, peroxide is introduced to the system during an in-situ acid leaching of ore to oxidize the uranium from the tetravalent oxidation state to the more soluble hexavalent form (C. R. Edwards and A. J. Oliver, *JOM,* 2000, 52, 12-20). Later in the process, U(VI) peroxide becomes a major constituent of commercial yellowcake due to the use of aqueous $H_2O_2$ during the precipitation step (Caropreso, F. E.; Kreuz, D. F. Production of uranium peroxide. CA patent document 1076365/A/, 1980.; and M. A. E. Abdel-Rahman and S. A. El-Mongy, *Zeitschrift für anorganische and allgemeine Chemie,* 2018, 644, 29-32). In addition, the high radiation fields associated with used nuclear fuel induces the formation of these U(VI) peroxide phases, making them an important consideration for stability of the waste forms (X. Guo, S. V. et al., *Proceedings of the National Academy of Sciences,* 2014, 111, 17737). Studtite and metastudtite have been observed as corrosion products on surfaces of used nuclear fuel within laboratory experiments (A. Canizarès, et al., *Journal of Raman Spectroscopy,* 2012, 43, 1492-1497), nuclear fuel suspended in cooling ponds (D. H. Brady, et al., *Radiochimica Acta,* 2005, 93, 159-168), and as alteration phases of corium at the Chernobyl site (B. Zubekhina, B. et al., Sustainability, 2021, 13, 1073; B. Zubekhina, B. et al., *Sustainability,* 2021, 13, 1073; and W. J. Gray and I. R. Triay, *Scientific Basis for Nuclear Waste Management XX,* Materials Research Society, 1997).

Given the importance of U(VI) peroxide phases within the nuclear fuel cycle, developing a robust understanding of the formation of such materials can lead to advances in fuel fabrication and waste reprocessing. Among the literature reports for U(VI) peroxide synthetic protocols, there are three major synthetic pathways leading towards their formation. First and most common is the direct addition of 30% aqueous $H_2O_2$ (L. Silverman, R. Sallach, R. Seitz and W. Bradshaw, *Industrial and Engineering Chemistry,* 1958, 50, 1785-1786). This straightforward approach is utilized in industrial processes on the front-end of the fuel cycle and is used in the laboratory setting to evaluate the basic chemistry of U(VI) peroxides (T. Sato, *Journal of Applied Chemistry,* 1963, 13, 361-365). Direct addition of hydrogen peroxide over the range of pH values, within mixed solvents systems, and in presence of varying counter ions and chelating organic ligands has resulted in the isolation of numerous uranyl peroxide nanoclusters, displaying vast structural diversity of uranyl peroxides in both solution and solid-state (P. C. Burns, *Mineralogical Magazine,* 2011, 75, 1-25; P. C. Burns and M. Nyman, *Dalton Transactions,* 2018, 47, 5916-5927; and A. Arteaga, et al., *Chemistry—A European Journal,* 2019, 25, 6087-6091). Second, U(VI) peroxide phases can be formed by a photochemical reaction with UV light (W. L. Waltz, et al., *Inorganica Chimica Acta,* 1999, 285, 322-325). This mechanism relies on photoexcitation of the uranyl ($U(VI)O_2^{2+}$) cation, allowing the $U{\equiv}O_{yl}$ to perform H-abstraction on the organic substrate, leaving behind a C-centred radical (S. G. Thangavelu and C. L. Cahill, *Inorganic Chemistry,* 2015, 54, 4208-4221). The organic radical then scavenges dissolved molecular $O_2$ from the solution, resulting in reactive $O_2$ species that can be intercepted by the uranyl cation (A. S. Jayasinghe, et al., *Crystal Growth & Design,* 2019, 19, 1756-1766; and D. V. Kravchuk and T. Z. Forbes, *Angewandte Chemie International Edition,* 2019, 58, 18429-18433). Last, radiolysis of $H_2O$ molecules under aerated conditions leads to radical cascade reactions that can result in the formation of U(VI) peroxides (J. F. Lucchini, C. Jegou, G. Sattonnay, C. Ardois and C. Corbel, France, International Conference Proceeding, Atalanta, 2000, 1-7). The major products of these radical cascades include superoxide radicals $O_2^{-}\cdot$, hydroperoxyl radicals $OOH\cdot$, hydroperoxyl anions $OOH^{-}$, peroxide anions $O_2^{2-}$, and molecular hydrogen peroxides $H_2O_2$ (R. Radi, *Proceedings of the National Academy of Sciences,* 2018, 115, 5839; M. Hayyan, et al., *Chemical Reviews,* 2016, 116, 3029-3085; P. Alexander and D. Rosen, *Nature,* 1960, 188, 574-575; and D. V. Kravchuk, et al., A*ngewandte Chemie International Edition,* 2021, 60, 15041-15048). All of these species can potentially complex with U(VI) to form peroxide phases and this is the synthetic pathway that has been suggested for the observation of studtite and metastudtite on the surface of used fuel (J. F. Lucchini, C. Jegou, G. Sattonnay, C. Ardois and C. Corbel, France, International Conference Proceeding, Atalanta, 2000, 1-7; L. Sarrasin, et al., *The Journal of Physical Chemistry C,* 2021, 125, 19209-19218; and A. J. Popel, et al., *Journal of Alloys and Compounds,* 2018, 735, 1350-1356).

While current synthetic methods have led to advancements in our understanding of U(VI) peroxide chemistry, the major challenges include difficulties in controlling the chemical environment and formation of radioactive and corrosive waste streams (R. C. Ewing, *Nature Materials,* 2015, 14, 252-257; and P. C. Burns, R. C. Ewing and A. Navrotsky, *Science,* 2012, 335, 1184). The use of 30% (9.8 M) $H_2O_2$ results in a very reactive chemical environment that can induce breakdown of the peroxide under basic conditions (F. R. Duke and T. W. Haas, *The Journal of Physical Chemistry,* 1961, 65, 304-306). This leads to reports of fizzing and bubbling of the reaction and variability in the total concentration of peroxide present in the system (S. Hickam, et al., *Inorganic Chemistry,* 2019, 58, 5858-5864). While this has resulted in a larger number of U(VI) peroxide phases and topologies, it is difficult to precisely control the reaction conditions. Photochemical routes typically lead to low yields and limited formation of U(VI) peroxide compounds (J. A. Ridenour and C. L. Cahill, *New Journal of Chemistry,* 2018, 42, 1816-1831). For instance, previous reports in the literature have shown transformation of U(VI)-organic complexes to peroxides; however, this transformation is limited to the formation of small molecular units (dimers) (A. Blanes Diaz, D. V. Kravchuk, A. A. Peroutka, E. Cole, M. C. Basile and T. Z. Forbes, *European Journal of Inorganic Chemistry,* 2021, 2021, 166-176).

Irradiation is not a well-studied synthetic methodology due to the specialized facilities needed for these experiments. In this case, recreating the exact radiolytic conditions in the lab setting is more challenging and initial reports focused on direct irradiation of uranium-bearing media (A. Canizarès, et al., *Journal of Raman Spectroscopy,* 2012, 43, 1492-1497; and C. Jégou, et al., *Journal of Nuclear Materials,* 2005, 341, 62-82). However, a radical initiator method that mimics the lower levels of peroxide generated in an irradiation study has been developed (D. V. Kravchuk and T. Z. Forbes, *Angewandte Chemie International Edition,* 2019, 58, 18429-18433). While gamma irradiation of oxygenated solutions results in continuous peroxide generation at levels of $1.25\cdot10^{-4}$ M (P. A. Yakabuskie, J. M. Joseph, C. R. Stuart and J. C. Wren, The Journal of Physical Chemistry A, 2011, 115, 4270-4278.), the autoxidation of benzaldehyde via a radical pathway generates comparable levels of peroxide in solution ($\sim2\cdot10^{-5}$M) and results in the formation of U(VI) peroxide phases (D. V. Kravchuk and T. Z. Forbes, *Angewandte Chemie International Edition,* 2019, 58, 18429-18433). The major drawback to this methodology is the need for non-aqueous chemistry to sustain the radical initiator process.

Mechanochemistry uses mechanical energy (e.g., ball milling) to induce a chemical reaction. It is considered a green technology, because the solvent waste is minimized compared with traditional solution-based chemical reactions (J.-L. Do and T. Friščić, *ACS Central Science,* 2017, 3, 13-19). It has been successfully utilized in a range of materials (T. Friščić, et al., *Angewandte Chemie International Edition,* 2020, 59, 1018-1029), but is underexplored within the actinide chemistry. Reports on mechanochemistry of uranium focus on grinding simple uranium oxides or salts (e.g. $UO_3$, $U_3O_8$, and $UO_2(NO_3)_2.6H_2O$) (P. Kovacheva, et al., *Journal of Radioanalytical and Nuclear Chemistry,* 2007, 274, 481-490; P. Kovacheva, et al., *Journal of Radioanalytical and Nuclear Chemistry,* 2007, 274, 473-479; and P. Kovacheva, et al., *Journal of Radioanalytical and Nuclear Chemistry,* 2011, 287, 193-197), chelation of U(III) using borohydride ligands (T. V. Fetrow and S. R. Daly, *Dalton Transactions,* 2021, 50, 11472-11484; and T. V. Fetrow, et al., *Inorganic Chemistry,* 2020, 59, 48-61), complete/partial chlorination of $U_3O_8$ (S. Kitawaki, et al., *Journal of Nuclear Materials,* 2013, 439, 212-216), or synthesis of alternative U-based fuels (G. A. Alanko and D. P. Butt, *Journal of Nuclear Materials,* 2014, 451, 243-248).

Currently there is a need for improved methods that can be used to form actinide metal peroxides (e.g., uranium peroxides) without the use of liquids. Such methodology would decrease the need for the use of strong acids in the production or reprocessing of actinide metal oxides (e.g. uranium-based fuels for nuclear reactors).

SUMMARY

Using the methods of the invention, mechanochemistry has been used to generate actinide peroxides from U(IV), U(VI), and mixed valent (U(IV)/U(VI) oxides.

The invention provides the first mechanochemical synthesis of crystalline U(VI) peroxide phases by rotary milling of uranium trioxide $UO_3$ powders with solid metal peroxides $Me_xO_2$ (Me=Li, Na, Mg, Ca, Sr, Ba). Thus, the invention provides a mechanical method that can be used to form actinide peroxides (e.g., uranium triperoxide) without the use of liquids.

In one aspect the present invention provides a method for preparing an actinide metal peroxide, comprising contacting an actinide metal oxide with a solid metal peroxide under conditions that provide the actinide metal peroxide.

In another aspect, the invention provides an actinide metal peroxide prepared according to the method of the invention.

DETAILED DESCRIPTION

The following definitions are used, unless otherwise described.

The term "actinide metal" includes Uranium and Plutonium. In one embodiment, the actinide metal is Uranium.

The term "actinide metal oxide" includes $UO_2$, $UO_{2+x}$, $U_4O_9$, $U_3O_7$, $U_3O_8$, $UO_3$, $PuO_2$, and $PuO_{2+x}$. In one embodiment, the actinide metal oxide is actinide VI metal oxide. In one embodiment, the actinide metal oxide is actinide IV metal oxide. In one embodiment, the actinide metal oxide is $UO_3$. In one embodiment, the actinide metal oxide is $UO_2$.

The term "liquid-assisted grinding" (solvent-drop grinding) refers to an extension of solvent-free mechnanochemical methods, where a small amount of liquid is introduced to the milling reaction in order to enhance the reactivity of reagents. Parameter $\eta$ refers to the ratio of the volume of liquid additive to the combined weight of the reactants $\eta=V_{liquid}(\mu L)/m_{reagents}$ (mg). While $\eta=0$ μL/mg refers to neat solid on solid grinding, the typical values for liquid-assisted grinding are in the range $\eta=0\text{-}2$ μL/mg. In one embodiment, the method comprises liquid-assisted grinding.

The term "solid metal peroxide" includes any solid metal peroxide that is capable of converting an actinide metal oxide to an actinide triperoxide. In one embodiment, the solid metal peroxide has the formula $M_xO_2$, wherein M is Li, Na, Mg, Ca, Sr, or Ba. In one embodiment, M is Li or Na.

The term "rotary milling" includes the grinding of solid materials with or without a small amount of liquid in a mill to create smaller particles of the sample or start a mechanochemical reaction. In one embodiment, the rotary milling occurs in a ball mill or planetary ball mill. In one embodiment, the rotary milling occurs in a vertical roller mill.

In one embodiment, the method is carried out without solvent.

The invention will now be illustrated by the following non-limiting Examples.

EXAMPLES

Example 1. Preparation Of Uranium Triperoxide from $UO_3$

Materials

Solid-state mechanochemical reactions were prepared using powders of uranium trioxide (International Bio-Analytical Industries Inc., 99%), lithium peroxide (Acros Organics, 95%), sodium peroxide (Acros Organics, 96%), magnesium peroxide complex (Aldrich, technical grade), calcium peroxide (Spectrum, 60%), strontium peroxide (Aldrich, 98%), barium peroxide (Acros Organics, 95%). Caution: $UO_3$ contains radioactive $^{238}U$, which is an a emitter, and like all radioactive materials must be handled with care. These experiments were conducted by trained personnel in a licensed research facility with special precautions taken toward the handling, monitoring, and disposal of radioactive materials. Recrystallization reactions were prepared using ultrapure Millipore water (18.2 MΩ). Chemicals purchased were used directly without further purification.

Mechanochemical Synthesis

Synthetic procedure for $m_{30}$-$UO_3$—$Li_2O_2$ involved combining 0.03 gr of $UO_3$ solid ($1.10^{-4}$ moles) with 0.05 gr of $Li_2O_2$ solid ($1.10^{-3}$ moles) in the 5 mL stainless steel FTS "SmartSnap" grinding jars using two 5 mm stainless steel balls (304 grade) for grinding. The grinding jars were sealed using a Teflon insert and inserted into a Form-Tech Scientific (FTS) FTS1000 shaker mill operating at 1800 rpm. The samples were ground in 5-minute grinding intervals for the total of 15 minutes or 30 minutes. Reactions between $UO_3$ and $Na_2O_2$, $MgO_2$, $CaO_2$, $SrO_2$, and $BaO_2$ were performed according to the same procedure with varying the total time of grinding to optimize the yield of the reactions, if applicable.

Vibrational Spectroscopy

Solid-state and solution-state Raman spectra were acquired on a SnRI High-Resolution Sierra 2.0 Raman spectrometer equipped with 785 nm laser energy and 2048 pixels TE-cooled CCD. Laser power was set to the maximum output value of 15 mW, giving the highest achievable spectral resolution of 2 $cm^{-1}$. Each sample was irradiated for an integration time of 5-60 seconds (depending on the sample) and automatically reiterated three times in multi-acquisition mode. Three Raman spectra acquired per sample, averaged together, and normalized based on laser power and integration time. FT-IR spectra were collected on a Nicolet Nexus FT-IR Spectrometer from 500-4000 $cm^{-1}$. Approximately 10-20 mg of the fine reaction powder was mixed with the anhydrous KBr salt and pressed into a transparent pellet for data collection. To accurately process the vibrational signals observed, the background was subtracted, multiple peaks were fit using the peak analysis protocol with Gaussian and Lorentz functions, and all the fitting parameters converged in the OriginPro 9.1.0 (OriginLab, Northampton, MA) 64-bit software.

Powder X-Ray Diffraction

Powder X-ray diffraction data was collected on a Bruker D8 Advance diffractometer with Ni-filtered Cu Kα radiation (λ=1.5418 Å), voltage 40 kV and current 40 mA, in the continuous mode with scan range of 5-60° 2θ and step size of 0.05°. Samples were ground to fine powders using a mortar and pestle and run using zero background silica sample holders. Processing of the PXRD patterns, background subtraction, smoothing, Kα2 stripping, and peak selection was done using PreDICT indexing software from ICDD. The PXRD diffractograms were matched using the ICDD PDF-4+ database.

Scanning Electron Microscopy

Secondary electron and backscattered electron images were obtained with a Hitachi 3400N Scanning Electron Microscope for each sample. Reaction powders were removed from the grinding jar and directly adhered to a SEM stub by double-sided carbon tape. The operating voltage and the emission current were 15.0 kV and 80-120 μA respectively.

Results and Discussion

The mechanochemical reaction between $UO_3$ and $Li_2O_2$ powders resulted in a crystalline product after 30 minutes of rotary grinding at 1800 rpm ($m_{30}$-$UO_3$—$Li_2O_2$). The powder X-ray diffraction pattern of the solid product matched to the known crystalline phase $[UO_2(O_2)_3]_{12}[(UO_2(OH)_4)Li_{16}(H_2O)_{28}]_3 \cdot Li_6[H_2O]_{26}$, otherwise known as $ULi_{16}$ with no evidence of the U(VI) starting material (M. Nyman, et al., *Inorganic Chemistry,* 2010, 49, 7748-7755). $ULi_{16}$ is a nanoclustered assembly of uranyl triperoxide $UO_2(O_2)_3{}^{4-}$ and uranyl tetrahydroxide $UO_2(OH)_4{}^{2-}$ anionic monomers counterbalanced with extensive hydrated lithium frameworks. Vibrational spectra were complicated by the bands at 814 $cm^{-1}$ and 864 $cm^{-1}$ in the IR spectrum and 789 $cm^{-1}$ in the Raman spectrum due to the presence of unreacted $Li_2O_2$ (H. H. Eysel and S. Thym, *Zeitschrift für anorganische and allgemeine Chemie,* 1975, 411, 97-102). Raman spectrum of $ULi_{16}$ product showed two bands at 715 and 737 $cm^{-1}$ that corresponded to the $\nu_1$(U═O) stretch of the $UO_2(O_2)_3{}^{4-}$ species (M. Dembowski, et al., *Inorganic Chemistry,* 2017, 56, 1574-1580). Low vibrational frequency of the uranyl symmetric stretch is rather common among uranyl triperoxide complexes due to significant σ-electron donation by the peroxide $O_2{}^{2-}$ ligands into the equatorial plane of the $UO_2{}^{2+}$ cation (G. Lu, et al., *Coordination Chemistry Reviews,* 2018, 374, 314-344). Such additional σ-donation causes weakening of the uranyl (U═$O_{yl}$) bond and enables the oxo group to engage in actinyl-cation interactions with surrounding $Li^+$ cations. The band at 767 $cm^{-1}$ could be assigned to residual, amorphous $UO_3$; however, due to the large FWHM of the peak, it could also be associated with the $\nu_1$(U═O) stretch of a $UO_2(OH)_4{}^{2-}$ phase in the final product. Finally, Raman band at 844 $cm^{-1}$ is well-aligned with symmetric $\nu_1$(O—O) of the peroxide ligand bound to the uranyl cation (M. Dembowski, et al., *Inorganic Chemistry,* 2017, 56, 1574-1580). Weak band at 1090 $cm^{-1}$ corresponded to the $CO_3{}^{2-}$ stretching of $Li_2CO_3$ that is produced as a byproduct of reaction between activated $Li_2O_2$ and molecular $CO_2$ from open air. The IR spectrum for mechanochemically synthesized $m_{30}$-$UO_3$—$Li_2O_2$ was well-matched to the vibrational bands of $ULi_{16}$ synthesized in solution from previous literature reports (M. Nyman, et al., *Inorganic Chemistry,* 2010, 49, 7748-7755).

While the mechanochemical reaction between $UO_3$ and $Li_2O_2$ took 30 minutes to create a highly crystalline product, a similar product was noted only after 15 minutes of rotary grinding of $UO_3$ with $Na_2O_2$ ($m_{15}$-$UO_3$—$Na_2O_2$). The PXRD pattern of the crystalline product matched the $Na_4[UO_2(O_2)_3] \cdot 9H_2O$ phase (NaUT), reported by Dembowski et al. (M. Dembowski, et al., *Inorganic Chemistry,* 2017, 56, 1574-1580). The synthesized $m_{15}$-$UO_3$—$Na_2O_2$ phase once again contains uranyl triperoxide monomers $UO_2(O_2)_3{}^{4-}$ that are charge balanced by $Na^+$ cations and engage in hydrogen bonding interaction with water molecules within the crystalline lattice. In case of $m_{15}$-$UO_3$—$Na_2O_2$, the analysis of vibrational spectra was more straightforward because bands associated with the $Na_2O_2$ starting material was not observed in this case. The major feature in the Raman spectrum of $m_{15}$-$UO_3$—$Na_2O_2$ was centred at 701 $cm^{-1}$ and corresponded to the $\nu_1$(U═O) stretch of the uranyl cation. The vibrations at 808, 819, and 842 $cm^{-1}$ corresponded to $\nu_2$, $\nu_3$, and $\nu_1$(O—O) stretches of the coordinated peroxide ligands $O_2{}^{2-}$ based on previously reported computational results (M. Dembowski, et al., *Inorganic Chemistry,* 2017, 56, 1574-1580). A weak band at 770 $cm^{-1}$ was assigned to a minor amount of unreacted $UO_3$ and a medium intensity band at 1080 cm$^{-1}$ corresponded to the carbonate $CO_3^{2-}$ in form of sodium carbonate $Na_2CO_3$. A notable feature in the IR spectrum of m$_{15}$-$UO_3$—$Na_2O_2$ is the red-shifted asymmetric $\nu_3$(U═O) stretch at 865 cm$^{-1}$, following a trend of the red-shifted symmetric $\nu_1$(U═O) stretches in the Raman spectra.

Increasing the reaction time of the $UO_3$—$Na_2O_2$ solid mixture to 30 minutes (m$_{30}$-$UO_3$—$Na_2O_2$) resulted in the formation of a different crystalline product mixture as evidenced by the experimental PXRD pattern. The powder pattern of m$_{30}$-$UO_3$—$Na_2O_2$ exhibits preferred orientation of particles and addition peaks in the diffractogram also indicate that the resulting phase was not a monophasic compound (C. F. Holder and R. E. Schaak, *ACS Nano,* 2019, 13, 7359-7365). Raman spectroscopy indicated that a uranyl triperoxide species ($UO_2(O_2)_3^{4-}$) was present in the solid phase based on similar spectroscopic features at 701 and 722 cm$^{-1}$ associated with the symmetric $\nu_1$(U═O) stretch of the uranyl cation coordinated to three $O_2^{2-}$ ligands. Vibrational bands associated with peroxide ligands were assigned to 790 ($\nu_2$), 808 ($\nu_3$), and 838 cm$^{-1}$ ($\nu_1$), whereas the peak at 767 cm$^{-1}$ can again be assigned with residual $UO_3$. The most unusual feature within the Raman spectrum of m$_{30}$-$UO_3$—$Na_2O_2$ was a weak band at 878 cm$^{-1}$ that has been previously observed for uranyl superoxide complex (D. V. Kravchuk, et al., *Angewandte Chemie International Edition,* 2021, 60, 15041-15048). Mechanochemically induced radical formation is particularly common for molecules containing peroxides or disulfides (G. Kaupp, *CrystEngComm,* 2009, 11, 388-403); thus, formation of reactive oxygen species from metal peroxide powders upon mechanical grinding is plausible. Presence of superoxide radicals within the m$_{30}$-$UO_3$—$Na_2O_2$ powder may explain the high reactivity of the mechanochemical reaction. In addition, ingrowth of carbonate in the solid-state compound was observed based on Raman bands at 1080 and 1057 cm$^{-1}$ that correspond to the $\nu_1$ stretch of $CO_3^{2-}$ associated with $Na^+$ and $UO_2^{2+}$, respectively. Capture of molecular $CO_2$ from air by the powder mixture is most likely a due to the creation of the reactive oxygen species and NaOH, which can form when $Na_2O_2$ is exposed to moisture in air.

Additionally, the mechanochemical reactions between $UO_3$ and solid alkali-earth metal peroxides ($MgO_2$, $CaO_2$, $SrO_2$, $BaO_2$) were explored under similar synthetic conditions. PXRD patterns and Raman analysis suggests that reactivity of alkali-earth metal peroxides increases down the group with $MgO_2$ being least reactive and $BaO_2$ being most reactive. In case of $MgO_2$ the resulting reaction product is still a mixture of starting materials. Moving down the group, PXRD patterns of product powders show decrease in crystallinity, as well as systematic decrease in vibrational signatures of $UO_3$ starting material (~6 vibrational bands in the 200-600 cm$^{-1}$ region). The reaction between $UO_3$ and $BaO_2$ results in $UO_3$ powder losing crystallinity and becoming completely amorphous as the diffraction peaks associated with uranium trioxide completely disappear from the diffractogram. Despite the increase in reactivity down the group, mechanochemical reactions with alkali-earth metal peroxide solids do not yield any U(VI) peroxide materials under the conditions explored herein.

The formation of the U(VI) triperoxide phase in the case of m$_{30}$-$UO_3$—$Li_2O_2$ and m$_{15}$-$UO_3$—$Na_2O_2$ has important implications to the development of starting material for use in the synthesis of larger U(VI) peroxide nanospheres or other phases. Monomeric U(VI) triperoxides have previously been shown to exhibit aqueous reactivity and self-assemble into peroxide/hydroxide bridged uranyl nanosphere polyoxometalate clusters over time (A. Arteaga, et al., *Chemistry—A European Journal,* 2019, 25, 6087-6091; and M. Nyman, et al., *Inorganic Chemistry,* 2010, 49, 7748-7755). For instance, Liao et al. dissolved lithium U(VI) triperoxide solids [$Li_4(UO_2)(O_2)_3.4H_2O$] in water and a catalyst solution to study the self-assembly of the Li—U$_{24}$ nanocapsule. The triperoxide starting material in this case was produced by dissolving uranyl nitrate hexahydrate in a solution containing 3 mL 30% $H_2O_2$ and 3 mL of 4 M LiOH solution and resulted in product yields of 75% based upon U.

To evaluate the transformation of the mechanochemically produce triperoxide phases, the synthesized powders for m$_{30}$-$UO_3$—$Li_2O_2$ and m$_{30}$-$UO_3$—$Na_2O_2$ were each dissolved in 2 ml of water and the capped vial was allowed to sit undisturbed on the benchtop. Overnight both solutions changed color from light yellow to deep orange and Raman spectroscopy of the resulting solution showed a significant amount of free carbonate based on the $\nu_1$ $CO_3^{2-}$ band at 1068 cm$^{-1}$ (for m$_{30}$-$UO_3$—$Li_2O_2$ and m$_{30}$-$UO_3$—$Na_2O_2$ solutions, respectively). Ingrowth of the dissolved carbonate was somewhat surprising due to relative stability of uranyl triperoxide monomers in solutions up to 96 hours after the dissolution (Z. Liao, et al., *Inorganic Chemistry,* 2014, 53, 10506-10513). However, the presence of mechanochemically induced reactive oxygen species within the solid-state could cause formation of uranyl superoxide species, which in turn has been shown to capture carbon both in solid-state and in solution (D. V. Kravchuk, et al., *Angewandte Chemie International Edition,* 2021, 60, 15041-15048; and D. V. Kravchuk and T. Z. Forbes, *ACS Materials Au,* 2021, DOI: 10.1021/acsmaterialsau.1c00033).

Recrystallized powder of m$_{30}$-$UO_3$—$Li_2O_2$ appeared to be crystalline mixture of $Li_2CO_3$ and an unknown phase that could not be matched to any known compound in the in the ICDD PDF-4+ database. Raman spectrum of recrystallized m$_{30}$-$UO_3$—$Li_2O_2$ displayed vastly different vibrational features compared to the original powder. The major intensity band centred at 1091 cm$^{-1}$ (vi $CO_3^{2-}$ bound to $Li^+$) further confirmed a significant amount of $Li_2CO_3$ present in the mixture and the peak at 1063 cm$^{-1}$ corresponds to the carbonate ligand symmetric stretch of the uranyl tricarbonate species $UO_2(CO_3)_3^{4-}$. This was well aligned with vibrational bands at 845 ($\nu_2$ out-of-plane bend of $CO_3^{2-}$), 744, and 711 cm$^{-1}$ ($\nu_4$ in-plane bend of $CO_3^{2-}$) (J. Cějka, et al., *Journal of Raman Spectroscopy,* 2010, 41, 459-464). The position of the uranyl symmetric stretch band at 816 cm$^{-1}$ in the Raman and antisymmetric stretch at 908 cm$^{-1}$ in the IR further suggested the formation of a U(VI) tricarbonate species ($UO_2(CO_3)_3^{4-}$). As a result, the unidentified crystalline phase in the PXRD of recrystallized m$_{30}$-$UO_3$—$Li_2O_2$ likely has a general chemical formula of $Li_4[UO_2(CO_3)_3]\cdot xH_2O$; however, a mineral or synthetic phase of lithium uranyl tricarbonate has not been reported in the literature to confirm this assignment.

Powder X-ray diffraction of recrystallized m$_{30}$-$UO_3$—$Na_2O_2$ resulted in highly crystalline material that matched a known sodium U(VI) tricarbonate phase, $Na_4[UO_2(CO_3)_3]$ (cějkaite). Vibrational signatures of carbonate anion were present in the Raman spectrum, including the symmetric stretching $\nu_1$ at 1073 (bound to $Na^+$) and 1063 cm$^{-1}$(bound to $UO_2^{2+}$), as well as doubly-degenerate in-plane bending $\nu_4$ at 702 and 734 cm$^{-1}$. Uranyl $\nu_1$ symmetric stretch was centered at 806 cm$^{-1}$ in the Raman spectrum with a complementary $\nu_3$ antisymmetric stretch showing up as a shoulder at 887 cm$^{-1}$ in the IR, both being characteristic of uranyl tricarbonate mineral phases (G. Lu, et al., *Coordination Chemistry Reviews,* 2018, 374, 314-344).

In both cases, the formation of larger U(VI) peroxide nanoclusters due to the presence of additional reactive oxygen species in the system was not observed. It is likely that if the experiment was performed in a $CO_2$ free atmosphere, then peroxide or novel materials containing reactive oxygen species may have been isolated from the solution. This methodology does lead to the formation of pure phase U(VI) tricarbonate species, which are somewhat difficult to form from aqueous solutions.

CONCLUSIONS

Mechanochemical synthesis has been successfully applied to $UO_3$ powders mixed with solid alkali metal peroxides, $Li_2O_2$ and $Na_2O_2$, resulting in crystalline uranyl triperoxide compounds $[UO_2(O_2)_3]_{12}[(UO_2(OH)_4)Li_{16}(H_2O)_{28}]_3\cdot Li_6[H_2O]_{26}$ and $Na_4[UO_2(O_2)_3]\cdot 9H_2O$, respectively. This is the first successful report using mechanochemistry to convert a U(VI) oxide phase to a crystalline peroxide product. The timeframe of the mechanochemical grinding played a significant role in driving the reaction to completion and controlling the overall product. In both cases, mechanicalochemical reactions of the solid metal peroxides likely induced the formation of reactive oxygen species, such as superoxide radical, which combined with alkalinity of reaction powders, resulting in carbon capture and formation of the carbonate anions. Both $m_{30}$-$UO_3$—$Li_2O_2$ and $m_{30}$-$UO_3$—$Na_2O_2$ reaction products were recrystallized in water yielding uranyl tricarbonate $UO_2(CO_3)_3^-$ phases charge balanced by either $Li^+$ or $Na^+$ cations, as confirmed by powder X-ray diffraction and vibrational spectroscopy. Such mechanochemical synthetic pathway to uranyl triperoxides may not only afford access to new crystalline compounds, but also avoid significant generation of radioactive liquid waste in the laboratory setting.

Example 2. Preparation Of Uranium Peroxide from $UO_2$

Mechanochemical reactions were carried out on a mixture of 0.03 g of $UO_2$ with 0.05 g of $Li_2O_2$ (or a molar equivalent of $Na_2O_2$) for neat grinding and with addition of 100 μL of 30% $H_2O_2$ $_{(aq)}$ as a liquid additive for liquid-assisted grinding LAG, where parameter $\eta \approx 1$ μL/mg (P. Ying, J. Yu and W. Su, *Advanced Synthesis & Catalysis,* 2021, 363, 1246-1271). Liquid-assisted grinding (solvent-drop grinding) is an extension of solvent-free mechnanochemical methods, where a small amount of liquid is introduced to the milling reaction in order to enhance the reactivity of reagents. Parameter η refers to the ratio of the volume of liquid additive to the combined weight of the reactants $\eta = V_{liquid}$ (μL)/$m_{reagents}$ (mg). While η=0 μL/mg refers to neat solid on solid grinding, the typical values for liquid-assisted grinding are in the range η=0-2 μL/mg compared to η≈1 μL/mg, which is used in the experiments herein. Samples were ground for 30 minutes in the 5 ml stainless steel milling jar with four 5 mm stainless steel balls on the rotary mill at 1800 rpm.

Mechanochemical activation of $UO_2$ powder itself was first evaluated using powder X-ray diffraction with an addition of corundum $Al_2O_3$ standard (25% by weight) to assess changes in crystallinity across the samples. The initial PXRD pattern of $UO_2$ solid showed strong diffraction peaks associated with $UO_2$ confirming a highly crystalline starting material with weak and broadened peaks matching to $UO_3$ suggesting minor surface oxidation of $UO_2$ upon exposure to air during handling. The intensity ratio between the diffraction peak associated with (111) crystallographic plane of $UO_2$ (2θ=28.5°) and (104) plane of $Al_2O_3$ (2θ=35.1°) in the initial PXRD was calculated to be 24.6:1 ($UO_2$:$Al_2O_3$) (Y. Hu, X. Han, F. Cheng, Q. Zhao, Z. Hu and J. Chen, Nanoscale, 2014, 6, 177-180). The powder pattern of solid uranium dioxide ground for 30 minutes ($m_{30}$-$UO_2$) revealed a significant decrease in peak intensities, as well as, peak broadening, suggesting the decrease in crystallinity and possible nanoscale domains of coherent diffraction. The peak intensity ratio against the standard in case of $m_{30}$-$UO_2$ was decreased to 4.2:1 ($UO_2$:$Al_2O_3$), suggesting a decrease of crystallinity from the original sample by a factor of 5.8. The mechanochemical impact on solid $UO_2$ alone demonstrated breakdown of crystallinity, decrease of particle size, which leads to increased surface area and enhanced reactivity of ground $UO_2$ powders.

This was further confirmed after the liquid-assisted grinding reaction with $Li_2O_2$ ($m_{30}$-$UO_2$-$Li_2O_2$ LAG) resulting in a new uranium crystalline phase and complete disappearance of peaks associated with crystalline $UO_2$ in the powder diffraction pattern. Reaction with solid $Li_2O_2$ was first performed as neat grinding to assess the oxidative capabilities of $Li_2O_2$. Powder X-ray diffraction pattern of the resulting solid $m_{30}$-$UO_2$—$Li_2O_2$ showed diffraction peaks associated with starting materials $UO_2$ and $Li_2O_2$ indicating no formation of crystalline product. However, Raman spectroscopy on the solid product revealed partial oxidation of $UO_2$ in form of amorphous uranium oxides. Vibrational band at 443 $cm^{-1}$ was assigned to the stoichiometric $UO_2$, while the shoulder at 458 $cm^{-1}$ corresponded to non-stoichiometric $UO_{2+x}$ (J. M. Elorrieta, L. J. Bonales, M. Naji, D. Manara, V. G. Baonza and J. Cobos, *Journal of Raman Spectroscopy,* 2018, 49, 878-884). The band at 627 $cm^{-1}$ matched very well with $U_4O_9$ formed during oxidation of $UO_2$ (J. M. Elorrieta, L. J. Bonales, M. Naji, D. Manara, V. G. Baonza and J. Cobos, *Journal of Raman Spectroscopy,* 2018, 49, 878-884). Bands at 562 $cm^{-1}$ and 593 $cm^{-1}$ can possibly correspond to vibrational bands of $U_3O_7$ and $U_3O_8$ (J. B. Lü, G. Li and S. L. Guo, *Guang Pu Xue Yu Guang Pu Fen Xi,* 2014, 34, 405-409). Weak bands at 717 $cm^{-1}$ and 730 $cm^{-1}$ match well with vi symmetric stretch of uranyl U═O bound to three peroxide ligands, suggesting minimal conversion to U(VI) triperoxide phase. A strong band at 785 $cm^{-1}$ is associated with the $\nu_1$(O—O) of peroxide anion in the $Li_2O_2$ starting material. Band at 1090 $cm^{-1}$ corresponds to $\nu_1$ stretching mode of $CO_3^{2-}$ bound to lithium. Mechanochemical impact on solid peroxide results in the formation of reactive oxygen species such as superoxide anions, that readily react with molecular $CO_2$ resulting in the ingrowth of carbonate phases (G. Kaupp, *CrystEngComm,* 2009, 11, 388-403; D. V. Kravchuk and T. Z. Forbes, *ACS Materials Au,* 2021, DOI: 10.1021/acsmaterialsau.1c00033). As a result, the neat grinding in case of $m_{30}$-$UO_2$—$Li_2O_2$ does not produce any crystalline product, however, vibrational spectroscopy suggests evidence of partially oxidized $UO_2$.

Liquid-assisted grinding approach with $Li_2O_2$ demonstrated significant ingrowth of crystalline material in the PXRD pattern of $m_{30}$-$UO_2$—$Li_2O_2$ LAG, while the peaks associated with crystalline $UO_2$ disappeared. The PXRD pattern of $m_{30}$-$UO_2$—$Li_2O_2$ LAG was not matched to any previously reported materials in the ICDD PDF-4+ database. However, Raman spectroscopy of the solid $m_{30}$-$UO_2$—$Li_2O_2$ LAG revealed two major vibrational bands at 716 $cm^{-1}$ and 735 $cm^{-1}$ aligning with $\nu_1$ symmetric stretch of U═O for uranyl triperoxide species (M. Dembowski, V. Bernales, J. Qiu, S. Hickam, G. Gaspar, L. Gagliardi and P. C. Burns, *Inorganic Chemistry,* 2017, 56, 1574-1580). The band at 786 $cm^{-1}$ was still associated with $\nu_1$ stretching of the peroxide anion from the $Li_2O_2$ starting material, however, the band at 847 $cm^{-1}$ corresponded to the symmetric O—O stretching of peroxide ligand bound to the uranyl cation, thus confirming the presence of uranyl triperoxide species. Liquid-assisted grinding was demonstrated to enhance the reactivity of $UO_2$ with $Li_2O_2$ under the same reaction conditions resulting in the formation of $U(VI)O_2(O_2)_3^{4-}$ species.

Oxidation of $UO_2$ was reasonably enhanced during neat grinding with $Na_2O_2$ as compared to the $Li_2O_2$ counterpart. The PXRD pattern of the product $m_{30}$-$UO_2$—$Na_2O_2$ still showed major diffraction peaks associated with $UO_2$ starting material, however, additional weaker peaks suggested ingrowth of a new crystalline phase that partially matched to $Na_4[UO_2(O_2)_3]\cdot 9H_2O$ uranyl triperoxide phase reported previously (N. W. Alcock, *Journal of the Chemical Society A: Inorganic, Physical, Theoretical,* 1968, DOI: 10.1039/J19680001588, 1588-1594). Raman spectroscopy of $m_{30}$-$UO_2$—$Na_2O_2$ revealed a complex mixture of uranium oxides, similar to the one observed in $m_{30}$-$UO_2$—$Li_2O_2$. Vibrational bands at 443 $cm^{-1}$ and 458 $cm^{-1}$ were assigned to $UO_2$ and $UO_{2+x}$, respectively, while a band at 627 $cm^{-1}$ was aligned with $U_4O_9$. A prominent band at 698 $cm^{-1}$ was associated with the uranyl symmetric stretch, while weaker bands at 810 $cm^{-1}$ and 838 $cm^{-1}$ corresponded to $\nu_3$ and $\nu_1$ O—O stretching of peroxide ligands, indicating a presence of uranyl triperoxide species. The neatly ground $m_{30}$-$UO_2$—$Na_2O_2$ displayed vibrational bands associated with the symmetric stretch of superoxide anion $O_2^{\bullet-}$ centered at 1136 $cm^{-1}$ and 1152 $cm^{-1}$(H. H. Eysel and S. Thym, *Zeitschrift für anorganische and allgemeine Chemie,* 1975, 411, 97-102). Presence of reactive oxygen species, such as superoxide anion, in the solid, suggests a mechanochemically induced electron transfer from the peroxide in the starting material to $UO_2$ solid, resulting in U(V) and U(VI) phases. The remaining superoxide radical can potentially undergo another electron transfer reaction with U(IV) or U(V) and leave the solid as molecular oxygen gas. A different reaction pathway for superoxide is reactivity with $CO_2$ from air resulting in the formation of $CO_3^{2-}$, presence of which is also evident in vibrational spectroscopy of $m_{30}$-$UO_2$—$Na_2O_2$ by the strong band at 1080 $cm^{-1}$.

Utilizing the liquid-assisted grinding approach with $Na_2O_2$ has further improved the crystallinity of the new uranium phase seen in the PXRD pattern of $m_{30}$-$UO_2$—$Na_2O_2$ LAG. The major diffraction peaks fully matched the sodium uranyl triperoxide phase $Na_4[UO_2(O_2)_3]\cdot 9H_2O$ confirming that the crystalline phase is fully converted from U(IV) to U(VI). Raman spectroscopy has supported the uranyl triperoxide species based on the vibrational bands centered at 695 $cm^{-1}$ (vi symmetric U═O stretch), 813 $cm^{-1}$($\nu_3$ $O_2^{2-}$ uranyl), and 842 $cm^{-1}$ ($\nu_1$ $O_2^{2-}$ uranyl). The band at 877 $cm^{-1}$ is most likely associated with free peroxide anion due to hygroscopic surface of the solid sample, however, we previously observed a band associated with uranyl superoxide stretch at 880 $cm^{-1}$, so the precise assignment of the band may be ambiguous (D. V. Kravchuk, N. N. Dahlen, S. J. Kruse, C. D. Malliakas, P. M. Shand and T. Z. Forbes, *Angewandte Chemie International Edition,* 2021, 60, 15041-15048).

All publications, patents, and patent documents (including Kravchuk, D. and Forbes, T. *Chem. Comm.,* 2022, 58, 4528-4531 and Kravchuk, D. and Forbes, T., *CrystEng-Comm,* 2022, 24, 775-781) are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method for preparing a compound, comprising uranyl triperoxide, comprising contacting a uranium oxide with a solid metal peroxide that comprises $Li_2O_2$ or $Na_2O_2$ under conditions that form a compound comprising uranyl triperoxide.

2. The method of claim 1, wherein the uranium, oxide and the solid metal peroxide are contacted by rotary milling.

3. The method of claim 1, wherein the contacting is carried out without solvent.

4. The method of claim 1, wherein the contacting comprises liquid-assisted grinding.

* * * * *